April 25, 1967 V. C. ANDERSON 3,316,544

REAL-TIME RUNNING MEAN GENERATOR

Filed May 22, 1963 3 Sheets-Sheet 1

INVENTOR
VICTOR C. ANDERSON

REAL-TIME RUNNING MEAN GENERATOR

Filed May 22, 1963 3 Sheets-Sheet 2

INVENTOR.
VICTOR C. ANDERSON

INVENTOR
VICTOR C. ANDERSON

United States Patent Office 3,316,544
Patented Apr. 25, 1967

3,316,544
REAL-TIME RUNNING MEAN GENERATOR

Victor C. Anderson, San Diego, Calif., assignor to The Regents of the University of California Filed May 22, 1963, Ser. No. 282,439
9 Claims. (Cl. 340—174.1)

This invention relates to a real-time running mean generator and more particularly to a real-time running mean generator in which a plurality of real time averaged outputs are available in discrete logarithmic period increments.

A running mean generator for generating averages in real-time in discrete logarithmic intervals, which can be utilized for a continuous cathode-ray tube display of averages varying in historical time in discrete increments, is extremely convenient and practical in many applications. A display of bearing history, for example in radar and sonar applications would be one use. Statistical analysis would constitute another use.

According to the present invention, an input signal is periodically gated into a recirculating delay means. The input signal is preferably a quantized analog signal and any necessary conversion can be added at the input of the system for signal compatibility. The output of the signal delay means is then gated into the input of a second recirculating delay means, the output of which is gated into a third recirculating delay means, etc., the number of delay means depending upon the maximum real-time average period desired. The outputs of at least two delay means at the end of the delay means chain are combined and gated back into the first delay means in a second, adjacent, time slot to the incoming information. In the case of combining the last two delay means after two complete recirculations for the entire system, these two outputs in the second time slot are again combined and inserted in a third time slot in the signal input delay means. After four circulations the outputs from the last two delay means corresponding to the third time slot will be combined and inserted into a fourth time slot in the delay means, etc. In the case of sixteen five-increment delay means being utilized, i.e. five time slots in each of sixteen recirculating delay means, the fifth slot will have the equivalent of the combination of sixteen of the input signals, the fourth time slot will have the combination of eight of the input signals, the third time slot will have the combination of four of the input signals, the second time slot will have the combination of two of the input signals and the first time slot will carry the current input signals. If the outputs from the delay means are then sampled sequentially, the information stored in each time slot from each delay means can be presented on suitable readout or utilization means such as a cathode-ray tube display.

It it therefore an object of the present invention to provide a real-time running mean generator for generating the real-time running mean of quantized analog signals.

Another object of the invention is the provision of a real-time running mean generator for generating the real-time running mean of signals in discrete period increments.

Yet aother object of the present invention is the provision of a real-time running mean generator for generating a plurality of real-time running means in discrete logarithmic period increments.

A still further object of the invention is the provision of a real-time running mean generator which utilizes conventional components throughout.

Yet another object of the invention is to provide an improved real-time running mean generator which is continuous and automatic in operation.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
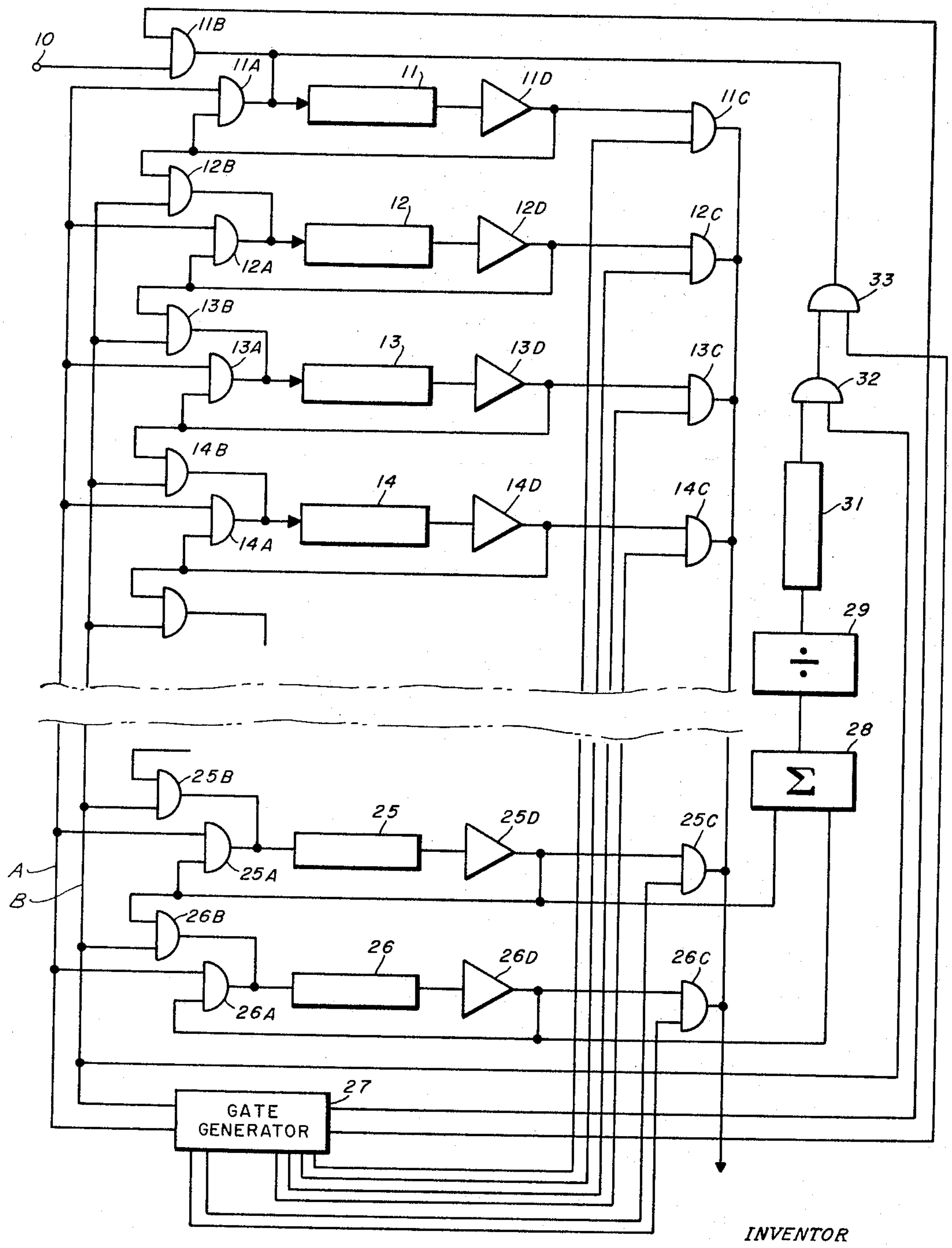
FIG. 1 is an illustration of the present invention in block diagram form.

Referring to FIG. 1, delay lines 11, 12, 13, 14, 25 and 26 have associated therewith gates 11A, 11B and 11C, gates 12A, 12B and 12C, gates 13A, 13B and 13C, gates 14A, 14B and 14C, gates 25A, 25B and 25C, and gates 26A, 26B and 26C, respectively. Delay lines and gates 15 through 24 are not shown in the interest of simplicity since the circuitry is identical to that shown. All of the gates shown are "And" or "coincidence" gates. Input terminal 10 is connected to one input of gate 11B, the other input of which is connected to one output from gate generator 27. Amplifiers 11D through 26D are all utilized to reshape the outputs from their respective delay lines and restore any signal amplitude depletion due to the delaying process. The outputs from amplifiers 25D and 26D are coupled to the input of combining network 28, the output of which is connected to normalize network 29. The output of normalize network 29 is passed through delay line 31 to one input of And gate 32. The output of And gate 32 is coupled to one input of And gate 33, the output of which is coupled to the input of delay line 11. All of the And gates in the circuit receive their gating signals from gate generator 27.

Figure 2:
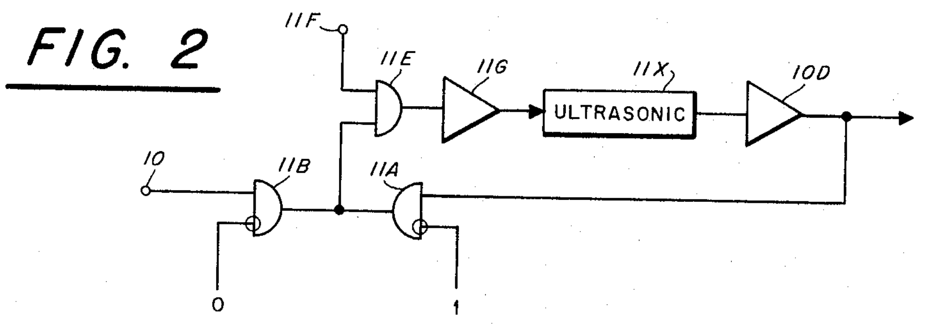
FIG. 2 is a further breakdown in block diagram of parts of FIG. 1.

Referring to FIG. 2, input terminal 10 is connected to gate 11B the output of which is connected to gate 11E. Terminal 11F is also connected to the other input of gate 11E, the output of which is connected to amplifier 11G. The output of amplifier 11G is connected to ultrasonic delay line 11X, the output of which is connected to amplifier 10D. The output of amplifier 10D is connected to one input of gate 11A.

Figures 3, 5, 6:
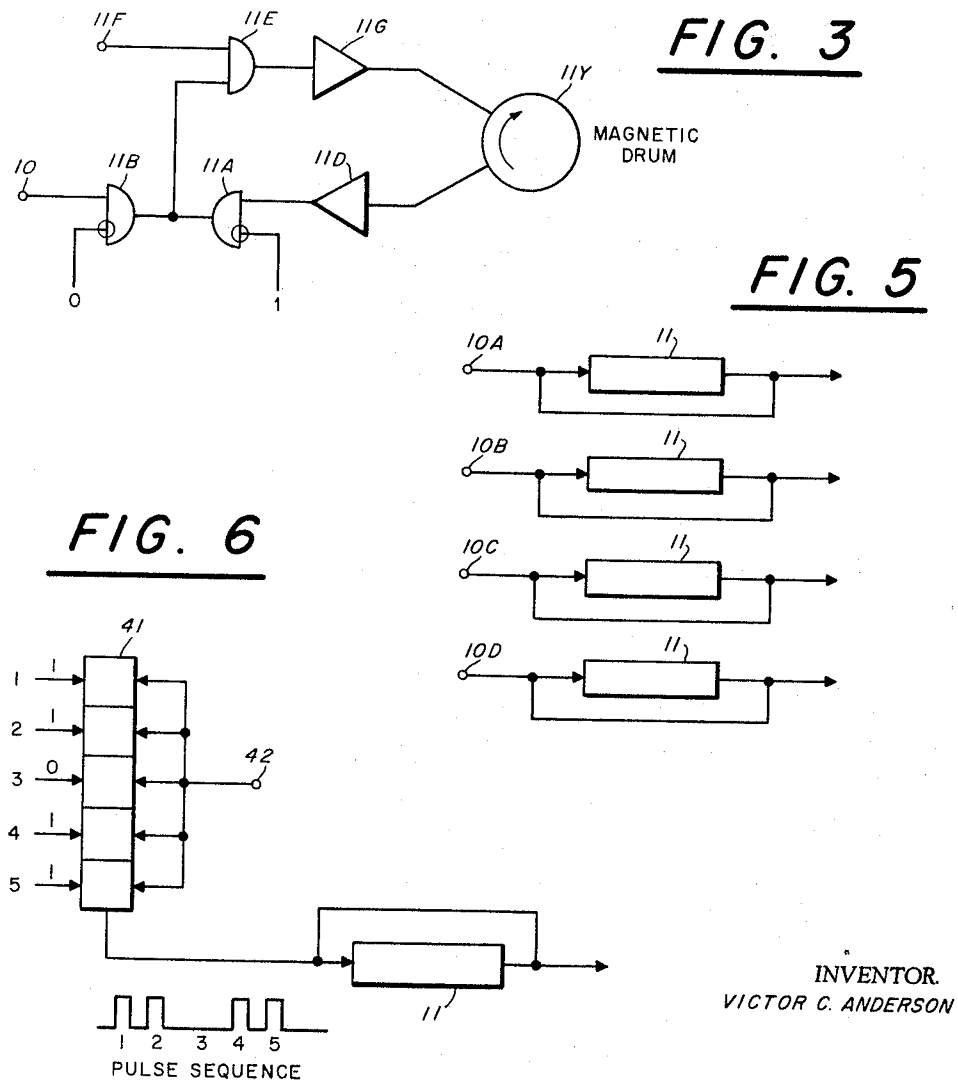
FIG. 3 is another embodiment of the block diagram of FIG. 2.
FIG. 5 illustrates in block form parallel coding in conjunction with the present invention.
FIG. 6 illustrates in block form serial coding in conjunction with the present invention.

Referring to FIG. 3, input terminal 10 is connected to one input of gate 11B, the output of which is connected to gate 11E. Another input of gate 11E is connected to input terminal 11F. The output of 11E is connected through amplifier 11G to magnetic drum 11Y. The output of magnetic drum 11Y is connected through amplifier 11D to one input of gate 11A.

Figure 4:
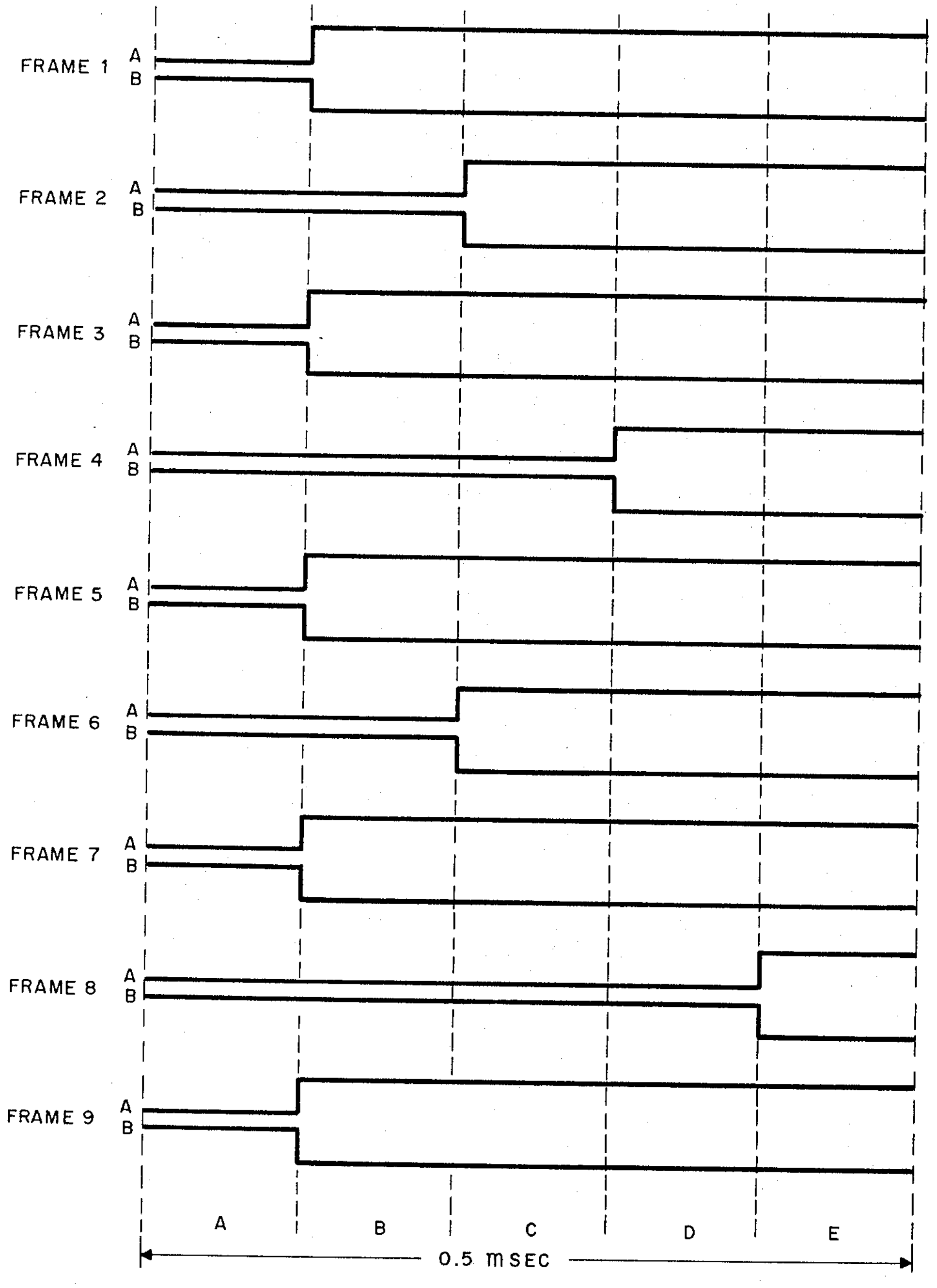
FIG. 4 illustrates the gating waveforms as applied to FIG. 1.

In FIG. 4 successive waveforms are shown as A and B in frames 1 through 9. At the top of FIG. 4 one frame time is depicted as having five time slots *a*, *b*, *c*, *d*, and *e*, respectively, for a total period of 0.5 millisecond.

FIG. 5 shows inputs 10A, 10B, 10C annd 10D each connected to a separate recirculating delay means 11.

Referring to FIG. 6, input bits 1, 2, 3, 4, and 5 are connected to shift register 41, as is input terminal 42. The output of shift register 41 is connected to recirculating delay means 11. This is shown in binary bit form labelled "pulse sequence."

*Operation*

The description of one embodiment of the log time base display is shown by FIG. 1. This embodiment is built around a set of recirculating delay line memories 11 through 26. These memories could equally well be ultrasonic delay lines, magnetic drum storage tracks, or composed of magnetic core memory elements or any other of the various types of memory components common to the computer technology. The particular circuit logic which would be used for the different types of memory would differ in detail and the format used for convenience of information storage might differ for the different memory configurations. Two of these are shown in FIGS. 2 and 3, respectively. However, the basic principle of the storage and recombination of information so as to change the time base of the stored information would remain the same. The embodiment illustrated in FIG. 1 incorporates sixteen one-half millisecond delay lines 11 through 26 and one one-tenth millisecond delay line 31. These delay times and the number of delay lines have been chosen for the purpose of explanation; the actual delay times and number of lines should be varied according to the specific application requirements. The sixteen delay lines 11 through 26 are connected as recirculating memories in accord with techniques common to the state of the art through the gates labelled 11A through 26A. A second set of gates labelled 11B through 26B are provided which may be used to transfer information stored in delay line 11 to delay line 12 and information from delay line 12 to delay line 13 and information from delay line 13 to delay 14 and so forth. The last two recirculating memories, 25 and 26, are connected through a combining network 28 to combine their two outputs into a single output. In the example chosen for illustration, the combining network consist of a summer. It could equally well be a multiplier, subtractor, maximum peak or "or" circuit etc. The output of this summing network 28 passes through a normalizing network 29 which for the purpose of this illustration is considered to be a divider although it could also include subtraction or other desirable arithmetical processes. Each one of the recirculating memories is capable of storing samples consisting of a large number of bits of information. The specific number of bits per sample is dictated by operational requirements but will, in general, be of the order of magnitude of 6 to 8. The multiple bits of information may be stored in either parallel lines or may be serially multiplexed into the delay line. The choice of format for the multiple bit storage is somewhat arbitrary depending on the economic considerations of the components used. In this illustration a recirculating multibit memory is symbolically represented as a single delay line channel. The information stored in the delay lines of this embodiment consists of a train of pulses, 0.5 millisecond long, which is called a frame. The frame is subdivided, as shown in FIG. 4, into 5 characteristic times, each one-tenth millisecond long identified as *a*, *b*, *c*, *d*, and *e*. By energizing the gate voltages A and B during a frame, information stored in one delay line will be transferred to the successive delay line. Thus, the presence of the gating voltages during the interval of the frame will transfer the portion of this frame which is recirculating in the delay lines to the next succeeding delay line. The information recirculating in the *a* interval of the frame in lines 25 and 26 is combined in the summing network 28 and then divided in dividing network 29 to effect an averaging, and then time delaying by line 31 for 0.1 millisecond. This averaged *a* interval information appears at the output of delay line 31 concurrent in time with the *b* interval of the frame. During transfer frames marked 2, 4, 6, 8 of FIG. 4 this averaged information is entered in frame interval *b* in delay line 11. The information stored in interval *b* in the set of delay lines is transferred to the successive lines in the same manner as the *a* interval information outlined above. The information occurring during interval *b* in lines 25 and 26 is also averaged in summing network 28 and divided network 29, and passed to delay line 31 where the averaged information is time delayed so as to make it coincident with frame *c*. On every fourth transfer frame this summed information is introduced into delay line 11 at interval *c*, and the information in the *c* interval of each delay line is advanced to its successive frame. Hence, the information in the *c* intervals represents the average of four successive *a* intervals combined into a single delay line, and it advances through the successive delay lines at one-fourth the rate of the information in the *a* intervals. This averaging and reinserting process is continued for interval *d* at one-eighth the rate of interval *a* and for interval *e* at one-sixteenth the rate of interval *a*. Additional clocking waveforms A′ and B′ shown in FIG. 4 are used to insert the initial information from the buffered input into the *a* interval of delay line 11 during the *a* interval transfer pulse. The incoming signal is buffered so as to match the storage format used in the delay lines. The exact configuration of the buffering circuit depends on the form of the incoming information and the specific format used for multibit storage in the recirculating memories. The entire format of output information is available every 0.5 millisecond at the output of the delay lines, and, with suitable scanning circuitry, may be displayed at a sufficiently high rate of speed on a cathode ray oscilloscope to provide a bright flicker-free visual indication of the information stored in the memory.

The basic recirculating memory means consist functionally of a storage medium, input-output transducers, and logic circuitry for reintroducing information into the storage medium or introducing new information into the medium. Two such recirculating memories are shown in FIGS. 2 and 3 as an illustration.

As can be seen in FIGS. 2 and 3, the operation of the two is generically the same. Information introduced in the memory means travels through the memory at the velocity of sound in the ultrasonic unit 11X of FIG. 2, or at the rotational speed of the magnetic drum 11Y of FIG. 3. The input or write amplifiers 11G are designed to provide the appropriate signal form for the memory means, i.e., a carrier modulated pulse for the ultrasonic delay line or a shaped pulse for the magnetic drum. The output or read amplifiers 11D detect the stored pulses in the memory after the transit time and reconstitute them to the pulse form required by the circuit logic. The information is in the form of binary "bits" i.e., discrete signals which have either of two states, "0" or "1." This information is passed through the recirculating gate 11A so as to reenter it in the memory for further storage. The recirculating gate 11A is normally conducting, but may be opened during any desired time interval and the new information gate 11B closed so as to change any portion of the information stored in the memory. The clock gate 11E serves to reshape and rephase the pulses so as to maintain their identity during an indefinite number of recirculations. When samples consisting of binary coded numbers are to be stored in this type of memory it is necessary to maintain an identifiable subgroup of numbers within the recirculation period. Depending on the exact information rate requirements of the application and the information rate capacity of the memory, either a parallel or serial grouping may be used. Parallel coding is illustrated by FIG. 5 where the separate bits making up the binary coded samples appear on individual inputs 10A, 10B, 10C and 10D in the equipment: Each input will have a time sequence of pulses which are introduced into individual recirculating memories 11 of the type shown in FIGS. 2 or 3, 11X or 11Y, one such memory is provided for each input. The binary bits of the samples will appear at the outputs of the recirculating memories coincident in time, and the sample identification will be in accord with its relative position in the recirculating pulse trains. For serial coding, the set of binary bits are introduced in a shift register 41 as shown in FIG. 6. The clock input of the shift register then advances the bits stored in the shift register so that they appear in time sequence as shown in the bottom of FIG. 6. By introducing new samples or sets of bits into the shift register in the correct sequence, successive samples may be placed adjacent to one another in the pulse sequence so that the multibit samples may be stored in a single recirculating line.

Combination of parallel and serial configurations may be used to best match the required information rate of the application to the information rate and capacity of the recirculating memories.

The multiple coding does not decrease the sample rate, but it does increase the complexity and total storage capacity of the recirculating memory equipment while the serial coding does not increase the memory size and interchanges the bit capacity per sample for the total number of samples stored. For the serial coding, the sample rate is inversely proportional to the number of bits per sample.

It should be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

I claim:

1. A real-time running mean generator for generating the real-time running mean of quantized analog signals comprising:

a plurality of recirculating delay means connected serially together through a plurality of first gating means, each of said delay means having an input and an output, a different one of said gating means connected to the input of each delay means;

one of said delay means comprising a signal-input delay means and having a gate connected to its input to reecive an input signal;

at least two of said delay means having combining and normalizing means connected to their outputs for combining and normalizing their outputs;

second gating means for inserting said normalized outputs into said signal input delay means; and means for sequentially reading out the outputs of each of said delay means.

2. A real-time running mean generator for generating the real-time running mean of quantized analog signals comprising:

a plurality of recirculating delay means connected serially together through a plurality of first gating means, each of said delay means having an input and an output, a different one of said gating means connected to the input of each delay means, each of said recirculating delay means having *n* time divisions;

one of said delay means comprising a signal-input delay means and having a gate connected to its input to receive an input signal;

a first gating signal having a duration of one of said time divisions connected to said signal input delay means gating means;

at least two of said delay means having combining and normalizing means connected to their outputs for combining and normalizing their outputs;

second gating means for inserting said normalized outputs into said signal input delay means; and means for sequentially reading out the outputs of each of said delay means.

3. A real-time running mean generator for generating the real-time running mean of quantized analog signals comprising:

a plurality of recirculating delay means connected serially together through a plurality of first gating means, each of said delay means having an input and an output, a different one of said gating means connected to the input of each delay means, each of said recirculating delay means having *n* time divisions;

one of said delay means comprising a signal-input delay means and having a gate connected to its input to receive an input signal;

a first gating signal having a duration of one of said time divisions connected to said signal input delay means gating means;

at least two of said delay means having combining and normalizing means connected to their outputs for combining and normalizing outputs;

second gating means for inserting said normalized outputs into said signal input delay means;

a second gating signal having a duration of one of said time divisions connected to said second gating means, said second gating signal displaced in time from said first gating signal; and means for sequentially reading out the outputs of each of said delay means.

4. A real-time running mean generator for generating the real-time running mean of quantized analog signals comprising;

a plurality of recirculating ultrasonic delay lines connected serially together through a plurality of first gating means, each of said delay means having an input and an output, a different one of said gating means connected to the input of each delay line;

one of said delay lines comprising a signal-input delay line and having a gate connected to its input to receive an input signal;

at least two of said delay lines having combining and normalizing means connected to their outputs for combining and normalizing their outputs;

second gating means for inserting said normalized outputs into said signal input delay line; and means for sequentially reading out the outputs of each of said delay line.

5. A real-time running mean generator for generating the real-time running mean of quantized analog signals comprising:

a plurality of recirculating ultrasonic delay lines connected serially together through a plurality of first gating means, each of said delay means having an input and an output, a different one of said gating means connected to the input of each delay line, each of said recirculating delay line having *n* time divisions;

one of said delay lines comprising a signal-input delay line and having a gate connected to its input to receive an input signal;

a first gating signal having a duration of one of said time divisions connected to said signal input delay line gating means;

at least two of said delay lines having combining and normalizing means connected to their outputs for combining and normalizing their outputs;

second gating means for inserting said normalized outputs into said signal input delay line; and means for sequentially reading out the outputs of each of said delay lines.

6. A real-time running mean generator for generating the real-time running mean of quantized analog signals comprising:

a plurality of recirculating ultrasonic lines connected serially together through a plurality of first gating means, each of said delay lines having an input and an output, a different one of said gating means connected to the input of each delay line, each of said recirculating delay lines having *n* time divisions;

one of said delay lines comprising a signal-input delay line and having a gate connected to its input to receive an input signal;

a first gating signal having a duration of one of said time divisions connected to said signal input delay line gating means;

at least two of said delay lines having combining and normalizing means connected to their outputs for combining and normalizing their outputs;

second gating means for inserting said normalized outputs into said signal input delay line;

a second gating signal having a duration of one of said time divisions connected to said second gating means, said second gating signal displaced in time from said first gating signal; and means for sequentially reading out the outputs of each of said delay lines.

7. A real-time running mean generator for generating the real-time running mean of quantized analog signals comprising:

a magnetic storage drum having a plurality of magnetic tracks connected serially together through a plurality of first gating means, each of said tracks having an input and an output, a different one of said gating means connected to the input of each track;

one of said tracks comprising a signal-input track and having a gate connected to its input to receive an input signal;

at least two of said tracks having combining and normalizing means connected to their outputs for combining and normalizing their outputs;

second gating means for inserting said normalized outputs into said signal input track; and means for sequentially reading out the outputs of each of said tracks.

8. A real-time running mean generator for generating the real-time running mean of quantized analog signals comprising:

a magnetic storage drum having a plurality of magnetic tracks connected serially together through a plurality of first gating means, each of said tracks having an input and an output, a different one of said gating means connected to the input of each track, each of said tracks having *n* time divisions;

one of said tracks comprising a signal-input track and having a gate connected to its input to receive an input signal;

a first gating signal having a duration of one of said time divisions connected to said signal input track gate;

at least two of said tracks having combining and normalizing means connected to their outputs for combining and normalizing their outputs;

second gating means for inserting said normalized outputs into said signal input track; and means for sequentially reading out the outputs of each of said tracks.

9. A real-time running mean generator for generating the real-time running mean of quantized analog signals comprising:

a magnetic storage drum having a plurality of magnetic tracks connected serially together through a plurality of first gating means, each of said tracks having an input and an output, a different one of said gating means connected to the input of each track, each of said tracks having *n* time divisions;

one of said tracks comprising a signal-input track and having a gate connected to its input to receive an input signal;

a first gating signal having a duration of one of said time divisions connected to said signal input track gate;

at least two of said tracks having combining and normalizing means connected to their outputs for combining and normalizing their outputs;

second gating means for inserting said normalized outputs into said signal input track;

a second gating signal having a duration of one of said time divisions connected to said second gating means, said second gating signal displaced in time from said first gating signal; and means for sequentially reading out the outputs of each of said tracks.

References Cited by the Examiner

Pages 121–139, April 1963, Allen, W. B. and Westerfield, E. C., "Digital Compressed-Time Correlators and Matched Filters for Active Sonar," Journal of the Acoustical Society of America, vol. 36, No. 1.

BERNARD KONICK, *Primary Examiner.*

V. P. CANNEY, *Assistant Examiner.*